(12) United States Patent
Kawai

(10) Patent No.: US 7,925,236 B2
(45) Date of Patent: Apr. 12, 2011

(54) CROSS POLARIZATION INTERFERENCE CANCELING METHOD AND CROSS POLARIZATION INTERFERENCE CANCELING APPARATUS

(75) Inventor: Masahiro Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 543 days.

(21) Appl. No.: 12/088,176

(22) PCT Filed: Oct. 18, 2006

(86) PCT No.: PCT/JP2006/320757
§ 371 (c)(1),
(2), (4) Date: Mar. 26, 2008

(87) PCT Pub. No.: WO2007/046427
PCT Pub. Date: Apr. 26, 2007

(65) Prior Publication Data
US 2009/0143042 A1    Jun. 4, 2009

(30) Foreign Application Priority Data

Oct. 20, 2005    (JP) ................................. 2005-306322

(51) Int. Cl.
*H04B 1/10* (2006.01)
(52) U.S. Cl. .................. 455/295; 455/63.1; 455/278.1; 455/296; 375/235
(58) Field of Classification Search .................. 455/295, 455/63.1, 278.1, 296, 67.11, 67.13, 303–305, 455/306, 146; 375/235, 229, 232, 346–347, 375/349
See application file for complete search history.

(56) References Cited

U.S. PATENT DOCUMENTS

| | | | |
|---|---|---|---|
| 5,710,799 A * | 1/1998 | Kobayashi | 375/349 |
| 5,838,740 A * | 11/1998 | Kallman et al. | 375/346 |
| 5,901,343 A * | 5/1999 | Lange | 455/63.1 |
| 6,236,263 B1 * | 5/2001 | Iwamatsu | 329/306 |
| 7,068,990 B1 * | 6/2006 | Herbig | 455/295 |
| 7,206,562 B2 * | 4/2007 | Kaneko | 455/295 |

(Continued)

FOREIGN PATENT DOCUMENTS

JP     03099537 A    4/1991

(Continued)

OTHER PUBLICATIONS

International Preliminary Report on Patentability for PCT/JP2006/320757 issued Sep. 9, 2008.

(Continued)

*Primary Examiner* — Pablo N Tran

(57) ABSTRACT

A cross polarization interference canceling apparatus of the present invention includes: error detector 26 for extracting a difference between a demodulated signal that is the main polarization signal in which compensation for cross polarization interference has been made and the received signal which indicates an ideal state of the main polarization, and outputting an error signal that indicates the extracted difference; phase noise detector 27 for outputting a phase noise difference by comparing a cross polarization interference compensating signal that is the opposite polarization signal in which compensation for cross polarization interference has been made with the error signal; a control signal generator for generating a control signal corresponding to the phase noise difference; and phase rotator 18' disposed prior to, or posterior to, a cross polarization interference canceller for generating the cross polarization interference compensating signal, for controlling the phase of the cross polarization interference compensating signal in such a direction as to suppress the phase noise difference, in response to the input of the control signal.

15 Claims, 16 Drawing Sheets

U.S. PATENT DOCUMENTS

| | | | |
|---|---|---|---|
| 2002/0061752 A1* | 5/2002 | Kurokami | 455/447 |
| 2004/0127179 A1* | 7/2004 | Sasaki | 455/146 |
| 2006/0148431 A1* | 7/2006 | Matsuura | 455/132 |
| 2010/0136916 A1* | 6/2010 | Kawai | 455/63.1 |

FOREIGN PATENT DOCUMENTS

| | | | |
|---|---|---|---|
| JP | 05219007 A | 8/1993 |
| JP | 06181464 A | 6/1994 |
| JP | 07177123 A | 7/1995 |
| JP | 09270764 A | 10/1997 |
| JP | 10313255 A | 11/1998 |
| JP | 2000013288 A | 1/2000 |
| JP | 2000165339 A | 6/2000 |
| JP | 2002158630 A | 5/2002 |
| JP | 2004201154 A | 7/2004 |

OTHER PUBLICATIONS

International Search Report for PCT/JP2006/320757 mailed Dec. 12, 2006.

* cited by examiner

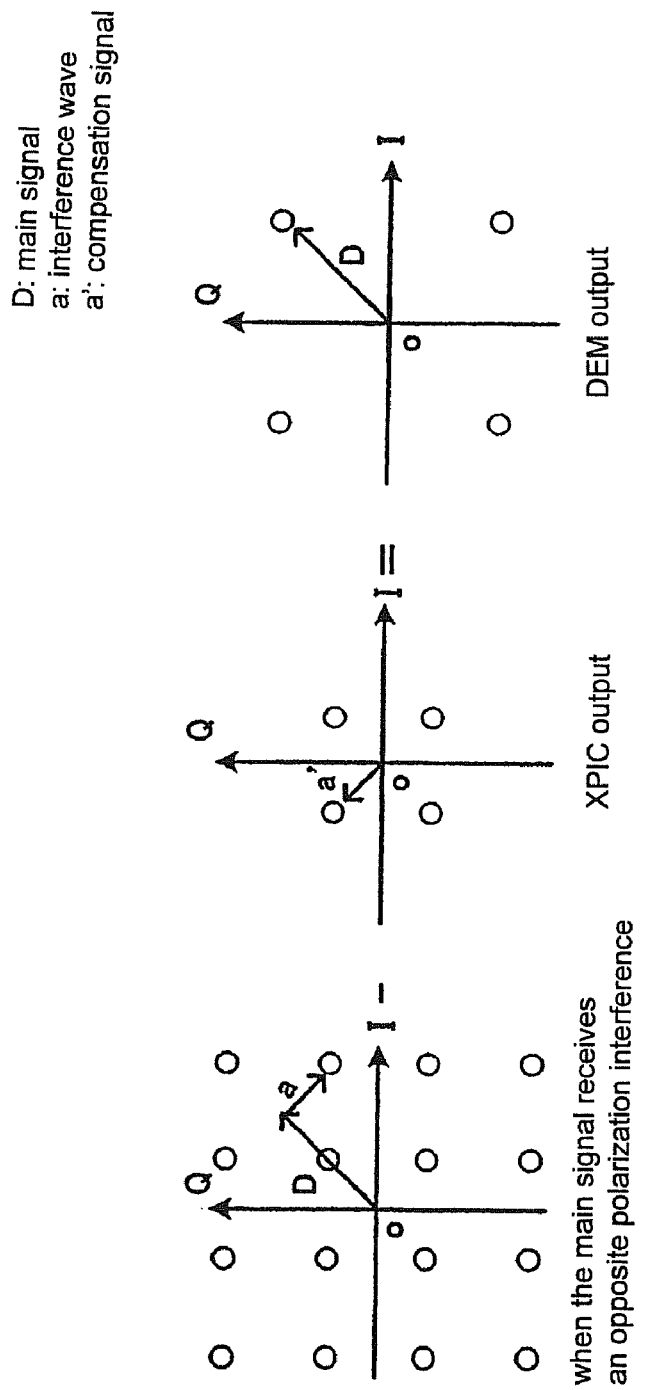

Fig.8B the relation of vectors between the interference wave and the compensation error when phase noise varies slowly

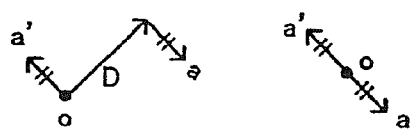

appearance of compensating when there is no influence of phase noise
("a" and "a' " are cancelled each other)

Fig.8C the relation of vectors between the interference wave and the compensation error when phase noise varies fast

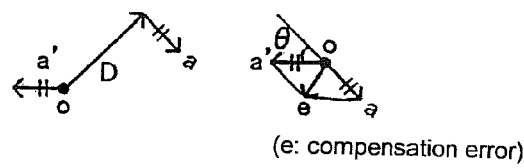

(e: compensation error)

appearance of compensating when the change is $\theta$ in phase of "a' " by influence of phase noise (compensation error appears)

$$\theta = 180 - 2 * (\angle a' oe)$$

CROSS POLARIZATION INTERFERENCE CANCELING METHOD AND CROSS POLARIZATION INTERFERENCE CANCELING APPARATUS

TECHNICAL FIELD

The present invention relates to a technology for canceling interference between cross polarized waves, in particular, relating to a preferable cross polarization interference canceling method and cross polarization interference canceling apparatus that are suitably used for transmission equipment of a co-channel transmission system in fixed microwave communications and the like.

BACKGROUND ART

As a method for canceling cross polarization interference in transmission equipment of a co-channel transmission system or the like, an XPIC (Cross polarization interference Canceller) has been used (see Japanese Patent Application Laid-open 2000-165339: this publication will be referred to hereinbelow as patent document 1). This scheme performs cancellation of cross polarization interference by generating a signal that cancels the interference signal from an orthogonal polarization wave (which will be referred to hereinbelow as opposite polarization) relative to an observable polarization wave (which will be referred to hereinbelow as main polarization) with reference to the opposite polarization-received signal and by adding it to the received signal.

In order to operate the XPIC, it is necessary to synchronize the interference wave with the carrier component of the main polarization received signal. In a quasi-coherent detection system, the reception local synchronization scheme for performing synchronization with a local signal on the receiver side is preferable. In the case of the reception local synchronization scheme, the local signal on the transmitter side does not need to be synchronized.

As a method for realizing reception local synchronization when using an XPIC in the co-channel transmission system, there are the common local scheme and the reference synchronization scheme. The common local scheme branches the output from a single RF local oscillator into two polarizations and supplies them to receivers for individual polarized waves. The reference synchronization scheme supplies the output from a low-frequency reference oscillator to each separate RF local oscillator (LO: Local Oscillator) in the receiver for each polarization, so that each local oscillator generates a RF local signal in synchronization with the reference oscillator to thereby perform synchronization with the local signal for each polarization.

Since, in the common local scheme, the output from a single RF local oscillator is branched into two parts to be supplied to different polarization receivers, the phase noise of the RF local signal does not affect the XPIC characteristics. However, if the RF local oscillator breaks down, the communications through both polarizations shut down, hence it is disadvantageous in terms of communications path reliability.

On the other hand, in the reference synchronization scheme, since each polarization receiver includes its own local oscillator, if one of them breaks down the transmission path of the other polarization that has not broken down and that will not shut down. Hence this method is advantageous in terms of communications path reliability. However, in this method, the phase noises from the RF local oscillators cause degradation of the characteristics of cross polarization interference cancellation. For this reason, RF local oscillators low in phase noise are used, but such oscillators low in phase noise are expensive, hence this scheme is disadvantageous in view of cost.

A conventional cross polarization interference canceling method will be described.

FIG. 1 is a diagram showing a configurational example of a cochannel transmission system using a common local scheme. IF (Intermediate Frequency) signals transmitted using V (vertical)-polarization and H (horizontal)-polarization are converted by means of mixers 1, 1' and oscillators 2, 2' into RF signals, which are sent out from antennas 3, 3'. The transmitted signals are received by reception antennas 4, 4' on the receiver side. Here, for description convenience, pairs of antennas 3, 3' and 4, 4' are shown separately so as to correspond to individual polarizations. In reality, however, 3, 3' and 4, 4' are each made of a single antenna.

In the common local scheme in FIG. 1, the output from single local oscillator 6 is branched and used as the RF local signals for converting RF signals into the IF signals.

FIG. 2 is a diagram showing an interior configurational example of local oscillator 6. Local oscillator 6 includes reference oscillator 14 that outputs a low-frequency signal as a reference, phase comparator (PD: Phase Detector) 15, voltage controlled oscillator 16 and frequency divider 17. Input to phase comparator 15 are the output from reference oscillator 14 and the signal that was obtained by frequency-dividing the output from voltage controlled oscillator 16 through frequency divider 17. Since the output from phase comparator 15 is input to voltage controlled oscillator 16, voltage controlled oscillator 16 constitutes a PLL (Phased Locked Loop) that oscillates at n-times the frequency of reference local oscillator 14. The output from voltage controlled oscillator 16 is used as the RF local signal.

In FIG. 1, the RF signal input to the receiver through antenna 4,4' is converted to the IF signal through mixer 5,5' and input to orthogonal demodulator 8,8'. The signal input to orthogonal demodulator 8,8' is orthogonally demodulated by local oscillator 7,7', then the orthogonally demodulated signal is input to DEM (demodulator) 9, 9', where the signal is processed by carrier reproduction, clock reproduction, and the like. The demodulated result is output as the main signal to adder 10,10'.

On the other hand, the IF signal input from the opposite polarization side is also input to orthogonal demodulator 11,11', so that the orthogonally demodulated signal is input to cross polarization interference canceller (which will be referred to hereinbelow as XPIC) 12, 12'. In XPIC 12, 12', the opposite polarization signal that has interfered with the main polarization signal by cross polarization interference arising through the transmission path is detected to generate and output a signal that cancels it. The signal output from XPIC 12, 12' is adjusted as to its phase rotation to that on the main signal side by EPS (Endless Phase Shifter) 13, 13', and the resultant is added to the main signal at adder 10, 10' to thereby compensate cross polarization interference.

FIG. 3 is a circuit block diagram showing in detail one constructional example of the part downstream of the outputs from orthogonal demodulators 8 and 11. In FIG. 3, complex multiplier 18, carrier phase comparator (Carr PD) 20, loop filter (Carr LPF) 21, accumulator (Acc) 22 and SIN/COS table 23 constitute a carrier reproduction PLL, and this loop reproduces the carrier.

In XPIC 24, if there is an opposite polarization input, a signal that cancels the cross polarization interference component that interfered with the main polarization is generated. In order to match the carrier phase of the interference wave mixed in the main polarization with the carrier phase of the compensating signal output from XPIC 24, complex multiplier 18' rotates the output signal from XPIC 24 by the same angle as the rotational angle of the main polarization. The output from complex multiplier 18' is added to the main polarization at adder 19 so as to cancel cross polarization interference. Complex multiplier 18' corresponds to a phase rotator.

Since in the case of this common local scheme, the local signal used in each polarization receiver is supplied from common local oscillator 6, the V-polarization that has been affected by phase noise $\phi 1$, namely signal $V(\phi 1)$ and the H-polarization signal that was mixed in due to cross polarization interference and affected by phase noise $\phi 1$, namely signal $H(\phi 1)$ are input to the V-polarization receiver. Further, as to the opposite polarization input, the H-polarization signal that has been affected by phase noise $\phi 1$ is applied in the form of $H(\phi 1)$. Here, as to the relationship between the carrier component of the opposite polarization signal that has interfered with the main polarization and the carrier component of the received signal of the opposite polarization signal, they are totally identical as to both frequency and phase because the same output from local oscillator 6 is used for processing.

The phase noise component of the opposite polarization component mixed into the main polarization is $\phi 1$ while the phase noise of the received signal on the opposite polarization side is also $\phi 1$, hence there is no phase difference between the two signals due to phase noise. XPIC 12 shown in FIG. 1 can generate a phase-stable correcting signal without having any influence from phase noise when generating a correcting signal. That is, in this scheme, the phase noise from the local oscillator will not affect the capacity of cross polarization interference cancellation.

However, as stated above the problem entailing the common local scheme is that communications via both the polarizations shut down all at once if local oscillator 6 breaks down because the output from this single local oscillator 6 is branched for use. This feature is disadvantageous in terms of securing communications path reliability.

FIG. 4 is a diagram showing a configurational example of a cochannel transmission system adopting a reference synchronization scheme. As shown in FIG. 4, this configuration is the same as that of the common local scheme in FIG. 1 except that each polarization receiver includes local oscillator 6 or 6'. In the reference synchronization scheme, each polarization receiver includes local oscillator 6, 6'. Then, in order to synchronize the frequencies of local oscillators 6, 6' with each other, the output of a reference signal from low-frequency reference oscillator 25 that is to be the reference is branched so that each local oscillator 6, 6' can generate a local signal synchronized with the reference signal. With this architecture, if one of local oscillators 6, 6' has broken down, the transmission path via the other polarization which is not broken will not be cut off.

FIG. 5 is a diagram showing a configurational example of local oscillator 6, 6' used in the reference synchronization scheme. As shown in FIG. 5, local oscillator 6, 6' includes phase comparator 15, voltage controlled oscillator 16 and frequency divider 17. Input to phase comparator 15 are a low-frequency reference signal from without and the signal which is the output from voltage controlled oscillator 16 that is n-th frequency-divided by frequency divider 17. Since the output from phase comparator 15 is input to voltage controlled oscillator 16, voltage controlled oscillator 16 constitutes a PLL that oscillates at n-times the frequency of the reference signal input. The output from voltage controlled oscillator 16 is used as the RF local signal. In the reference synchronization scheme, the local signals used for the polarizations are generated by different PLLs, so that the phase noises arising have no correlation with the other.

Accordingly, in the reference synchronization scheme, due to the phase noises involved with separate local oscillators 6, 6' of the V/H polarization receivers, the phase relationship between the local signals output from these local oscillators 6 and 6' is always changing. As a result, a phase change that reflects the difference between the phase noises of local oscillators 6 and 6' appears between the phase of the opposite polarization component that was mixed into the main polarization and the phase of the received signal on the opposite polarization side. More specifically, as shown in FIG. 4, when the signal in the V-polarization reception line that was affected by phase noise $\phi 1$ arising in local oscillator 6 is expressed as $V(\phi 1)$, the component from the H-polarization that has interfered with the V-polarization in the transmission path is affected by phase noise $\phi 1$ that arises in local oscillator 6, forming $H(\phi 1)$. Resultantly, a signal $V(\phi 1)+H(\phi 1)$ as the result of cross polarization interference is input to the V-polarization reception line.

On the other hand, in XPIC 12 a H-polarized received signal named $H(\phi 2)$ that has been affected by phase noise $\phi 2$ of local oscillator 6' from the H-polarization reception line is input. Here, for simplicity the interference with the H-polarization from the V-polarization will not be considered. XPIC 12 generates a signal that cancels out $H(\phi 1)$ that interfered with the main polarization input by reference to the opposite polarization input named $H(\phi 2)$. At the same time, XPIC 12 has to generate a correction signal by taking into consideration even the phase difference $(\phi 1-\phi 2)$. Since an XPIC generally has a phase rotating function, it is possible to perform correction following the phase difference $(\phi 1-\phi 2)$ originated from phase noise when the temporal change of this phase difference is slower than the time constant of the XPIC operation. However, if phase change exceeding the time constant of the XPIC occurs due to a phase noise, it is impossible for the XPIC to achieve proper compensation, then characteristics degradation appears.

This behavior will be described with FIG. 6. FIG. 6 is a chart showing the behavior of the phase noise in a RF local signal, representing a spectrum centered at the oscillation frequency of the local signal. This shows that the farther away the frequency moves from the center, the lower the power density becomes, and that the father away the frequency moves from the center, the smaller the frequency component of the phase noise becomes. The phase noise component in the limited low-frequency area can be followed by the XPIC and the influence of the phase noise can be compensated.

However, the XPIC cannot react in the region beyond the range which is possible for the XPIC to follow the phase noise, so that the phase noise component is output directly from the XPIC. As a result, when the XPIC output is added to the main polarization signal, it will not match the phase of the interference wave in the main polarization, hence producing compensation error, resulting in characteristic deterioration. It is possible to increase the speed for following the phase noise if the time constant of updating XPIC tap coefficients is made greater. However, this increases the noise arising from the XPIC itself, so in effect there is a limit to increase the time constant of the XPIC. For this reason, when an XPIC based on a reference synchronization scheme is used, it is necessary to use an expensive local oscillator that provides low phase noise figure.

DISCLOSURE OF INVENTION

As described above, when a common local scheme is adopted as the method of realizing reception local synchronization when an XPIC is used in the co-channel transmission system, there is the advantage that the phase noise from the local oscillator will not affect the capacity of cross polarization interference cancellation. However, because the output from a single local oscillator is branched for use, there is the problem that both communications through the two polarizations shut down all at once if this local oscillator breaks down. This is disadvantageous in terms of communications path reliability.

On the other hand, the reference synchronization scheme in which the local oscillator that is provided for each polarization receiver is frequency-synchronized based on the signal from a reference oscillator has an advantage that if one local oscillator breaks down, the communication path via the other polarization can be secured. However, though either local oscillator provided for each polarization receiver is frequency-synchronized based on the signal from the reference oscillator, the phase noise involved in each local oscillator is irrelevant from the other. Accordingly, there occurs the problem that the phase noise from each local oscillator causes characteristic degradation. For improvement against the characteristics deterioration, a high-cost local oscillator that provides low noise phase figure needs to be used.

In view of the above problems, the object of the present invention is to provide a cross polarization interference canceling method and apparatus which can cancel the influence from the phase noise from a local oscillator having a high level of phase noise and can prevent the phase noise from deteriorating the cross polarization interference canceling capability even if an inexpensive oscillator is used.

A cross polarization interference canceling method of the present invention is a cross polarization interference canceling method based on a reception local synchronization scheme for canceling interference between main polarization and opposite polarization, the method comprises the steps of: extracting a first phase noise difference that is phase noise difference between the main polarization and the opposite polarization in the receiver-side local oscillators, by comparing an error signal that indicates a difference between a demodulated signal that is the main polarization signal in which compensation for cross polarization interference has been made and the received signal which indicates an ideal state of the main polarization with a cross polarization interference compensating signal that is the opposite polarization signal in which compensation for cross polarization interference has been made; and suppressing a second phase noise difference that is the phase noise difference contained in the cross polarization interference compensating signal, by using the first phase noise difference.

Another cross polarization interference canceling method of the present invention is a cross polarization interference canceling method based on a reception local synchronization scheme for canceling interference between main polarization and opposite polarization, the method comprises the steps of: extracting a first phase noise difference that is phase noise difference between the main polarization and the opposite polarization in the receiver-side local oscillators, by comparing an error signal that indicates a difference between a demodulated signal that is the main polarization signal in which compensation for cross polarization interference has been made and the received signal which indicates an ideal state of the main polarization with a cross polarization interference compensating signal that is the opposite polarization signal in which compensation for cross polarization interference has been made; and suppressing a second phase noise difference that is the phase noise difference contained in the opposite polarization signal based on which the cross polarization interference compensating signal is generated, by using the first phase noise difference.

Further, in the above cross polarization interference canceling method of the present invention, when the vector of the cross polarization interference compensating signal is a' and the vector of the error signal is e on the phase rotational angle coordinates, the first phase noise difference θ may be extracted by $$\theta = \pi - 2 \times (\angle a'oe),$$

($\angle a'oe$ is the angle between vector a' and vector e, inclusive of the rotational direction).

Further, application of the present invention to an XPIC of a reference synchronization scheme in which in particular, phase noise is problematic, as a reception local synchronization scheme, is remarkably preferable in making improvements against characteristics deterioration arising from the phase noise difference between the receiver side local oscillators for the main polarization and opposite polarization.

On the other hand, a cross polarization interference canceling apparatus of the present invention is a cross polarization interference canceling apparatus based on a reception local synchronization scheme for canceling interference between main polarization and opposite polarization, the apparatus comprises: an error detector for extracting a difference between a demodulated signal that is the main polarization signal in which compensation for cross polarization interference has been made and the received signal which indicates an ideal state of the main polarization and outputting an error signal that indicates the extracted difference; a phase noise detector for outputting a phase noise difference by comparing a cross polarization interference compensating signal that is the opposite polarization signal in which compensation for cross polarization interference has been made with the error signal; a control signal generator for generating a control signal corresponding to the phase noise difference; and a phase rotator disposed prior to, or posterior to, a cross polarization interference canceller for generating the cross polarization interference compensating signal, for controlling the phase of the cross polarization interference compensating signal in such a direction as to suppress the phase noise difference, in response to the input of the control signal.

In general, a cross polarization interference canceller (XPIC) uses an adaptively controlled FIR (Finite Impulse Response) filter. In order to suppress the influence of polarity variation of the control signal due to noise, the tap coefficient generator has a relatively large time constant. On the other hand, the phase rotator, by changing the rotational direction only with keeping the amplitude unvaried, focuses on the phase rotation as its controllable parameter, hence a high speed time constant can be expected.

Further, since usually the influence of phase noise on the local signal causes a change mainly in phase and brings about little change in amplitude, controlling the phase by the phase rotator makes it easy to follow a high-speed phase change caused by the phase noise of the local signal.

For this reason, according to the present invention, combination of an XPIC and a phase rotator that is controlled by the signal corresponding to the phase noise difference between the local signals, provides an architecture in which the phase noise component is absorbed by the phase rotator while the other change in amplitude is adjusted by the XPIC itself, thereby making it possible to suppress influence of phase noise.

In the present invention, since a means of detecting the difference between the phase noises in the receiver-side local oscillators for the main polarization and opposite polarization from the received signal and suppressing the phase noise difference contained in the cross polarization interference compensating signal based on the detected result is provided, it is no longer necessary for the XPIC to follow the phase noise difference.

Further, since the phase rotator for suppressing phase noise difference uses a lower number of parameters that are to be varied compared to the phase rotation based on a change of the tap coefficients inside XPIC, the time constant for control can be made small. Accordingly, it is possible to make the time constant of the XPIC correspondingly greater, hence it is possible to suppress the noise arising from the XPIC itself when the time constant of the XPIC is set smaller.

Also, in an XPIC of a reference synchronization scheme in which phase noise is problematic, in the present invention, the phase of the interference component mixed in the main polarization side is adjusted to phase by detecting the phase noise difference between the local signals by means of a phase noise detector and giving a phase rotation that will cancel the phase noise by means of a phase rotator provided at the XPIC output. Accordingly, even in the reference synchronization scheme, it is possible to create a condition in which the phase relationship between the carrier component of the interference wave and the carrier component of the compensating signal is stable, so that it is possible to prevent degradation of the cross polarization interference cancellation characteristics by phase noise by following the phase noise of higher frequency components.

Also, when inexpensive RF local oscillators that present relatively large phase noise are used to construct an XPIC of a reference synchronization scheme, it is possible to prevent the lowering of the cross polarization interference canceling capability based on phase noise.

BRIEF DESCRIPTION OF THE DRAWINGS

FIG. 8A is a diagram for illustrating the principle of compensating phase noise in the first exemplary embodiment.

FIG. 8B is a diagram for illustrating the principle of compensating phase noise in the first exemplary embodiment.

FIG. 8C is a diagram for illustrating the principle of compensating phase noise in the first exemplary embodiment.

Figure 1:
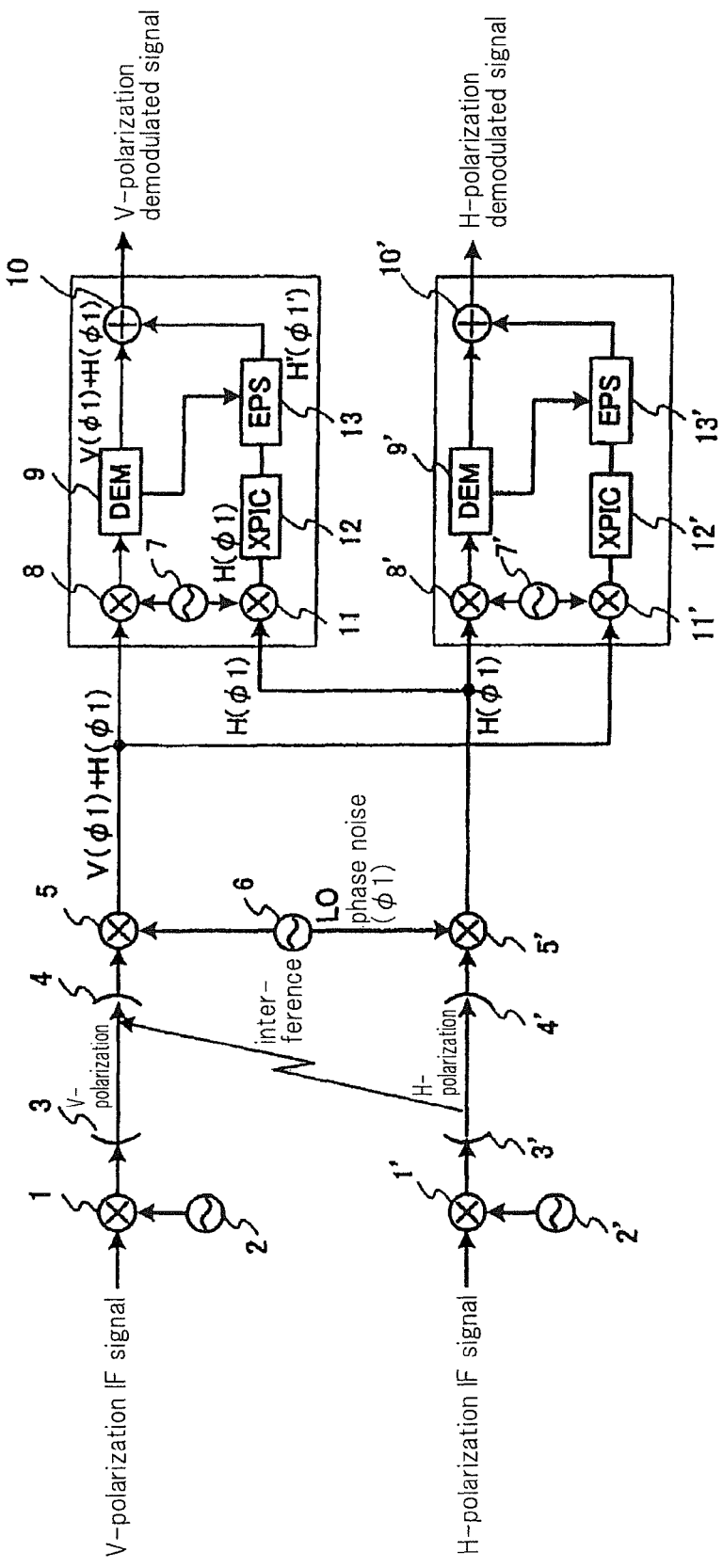
FIG. 1 is a diagram showing a configurational example of a co-channel transmission system adopting a common local scheme.
Figure 2:
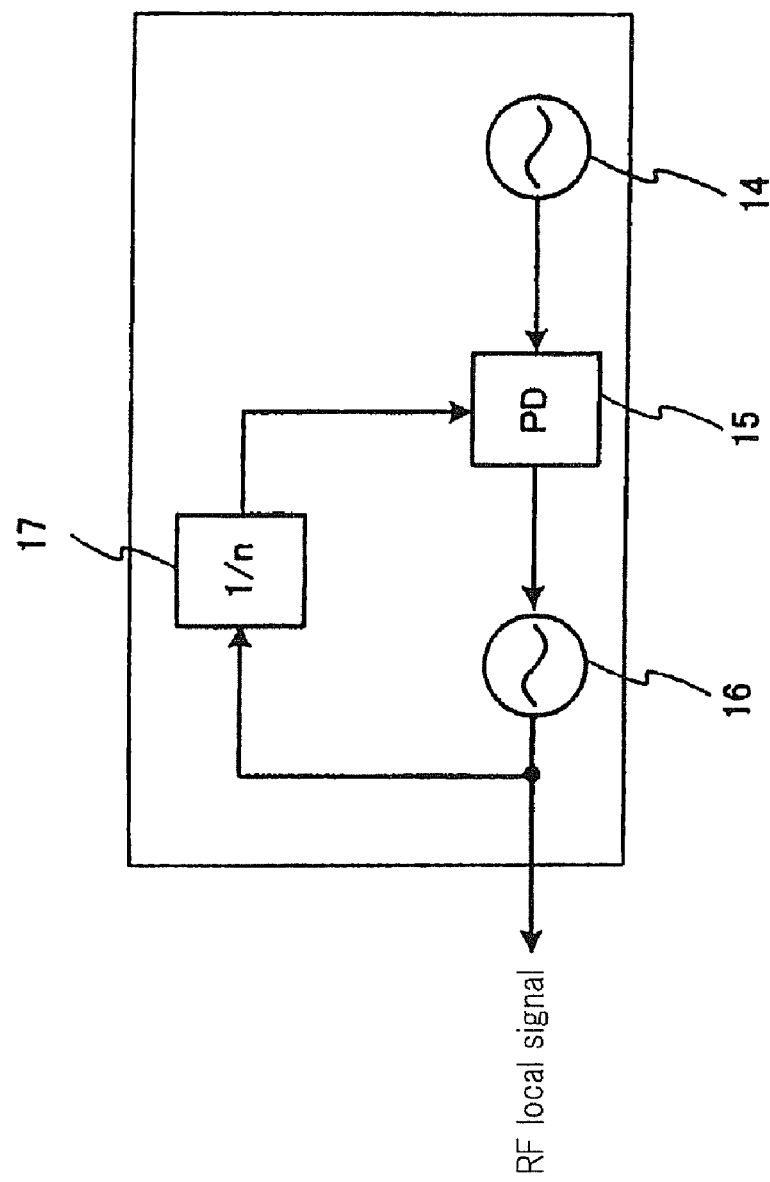
FIG. 2 is a diagram showing a configurational example of the inside of a RF local oscillator used for a common local scheme.

DESCRIPTION OF REFERENCE NUMERALS 1,1',5,5' mixer
2,2' oscillator
3,3',4,4' antenna
6,6',7,7' local oscillator
8,8',11, 11' orthogonal demodulator
9,9' DEM
10,10',19,29 Adder
12,12',24 cross polarization interference canceller (XPIC)
13,13' EPS
14,25 reference oscillator
15 phase comparator
16 voltage controlled oscillator
17 frequency divider
18,18' complex multiplier
20 carrier phase comparator
21 loop filter
22,22' accumulator
23,23' SIN/COS table
26 error detector
27 phase noise detector
28 multiplier

BEST MODE FOR CARRYING OUT THE INVENTION

The First Exemplary Embodiment

Figure 3:
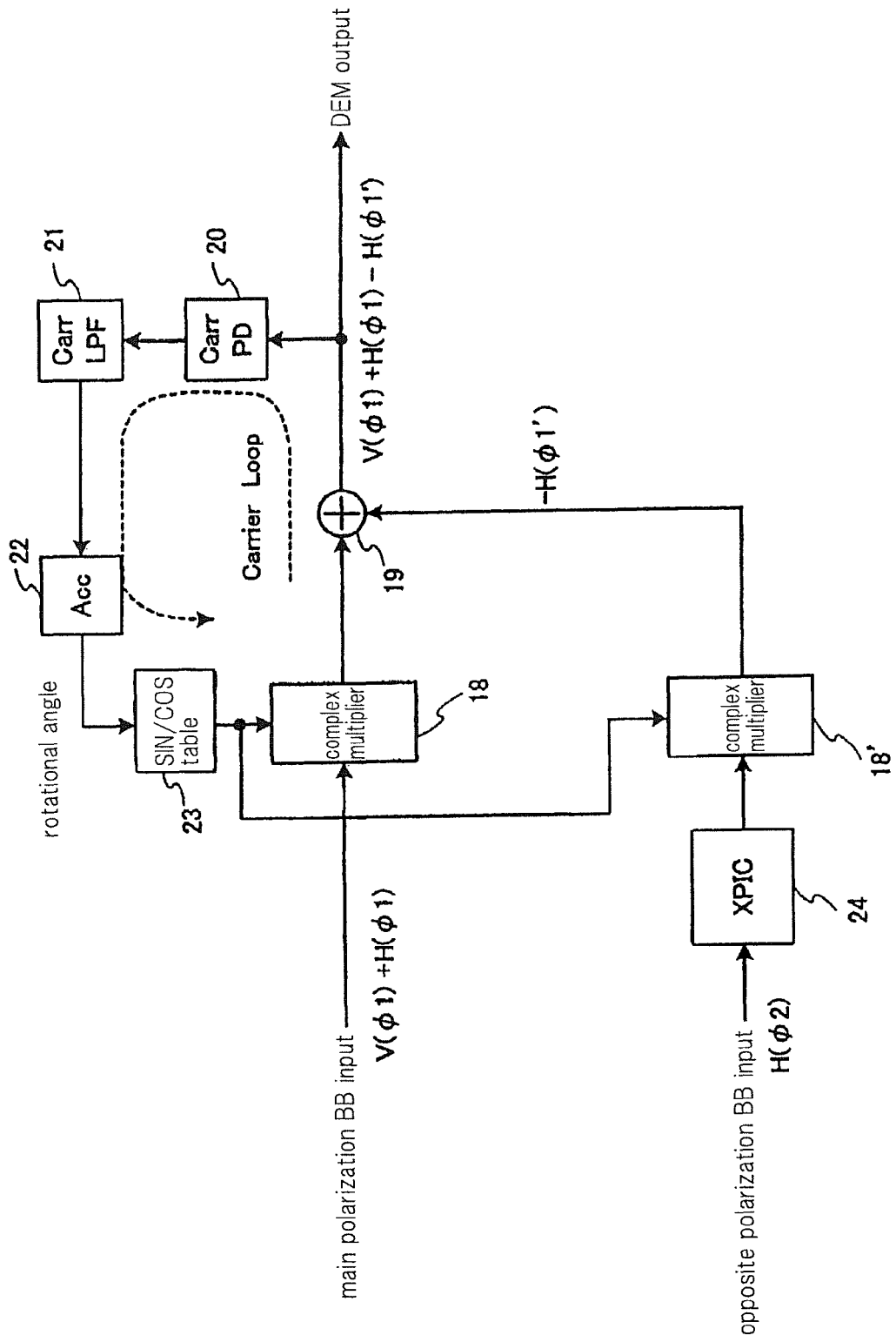
FIG. 3 is a circuit block diagram showing in detail a constructional example of the part downstream of the outputs from orthogonal demodulators in the cross polarization interference canceling apparatus shown in FIG. 1.
Figure 4:
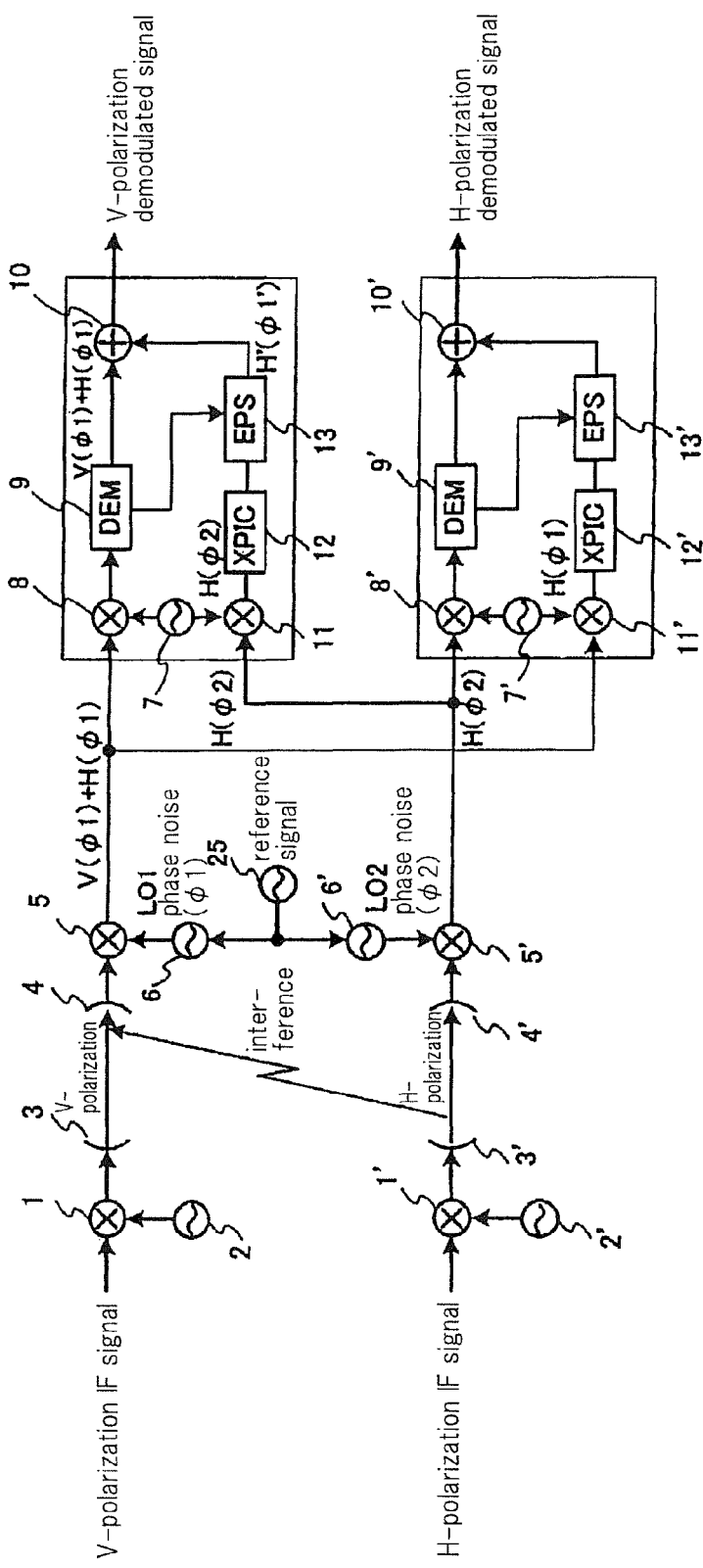
FIG. 4 is a diagram showing a configurational example of a co-channel transmission system adopting a reference synchronization scheme.
Figure 5:
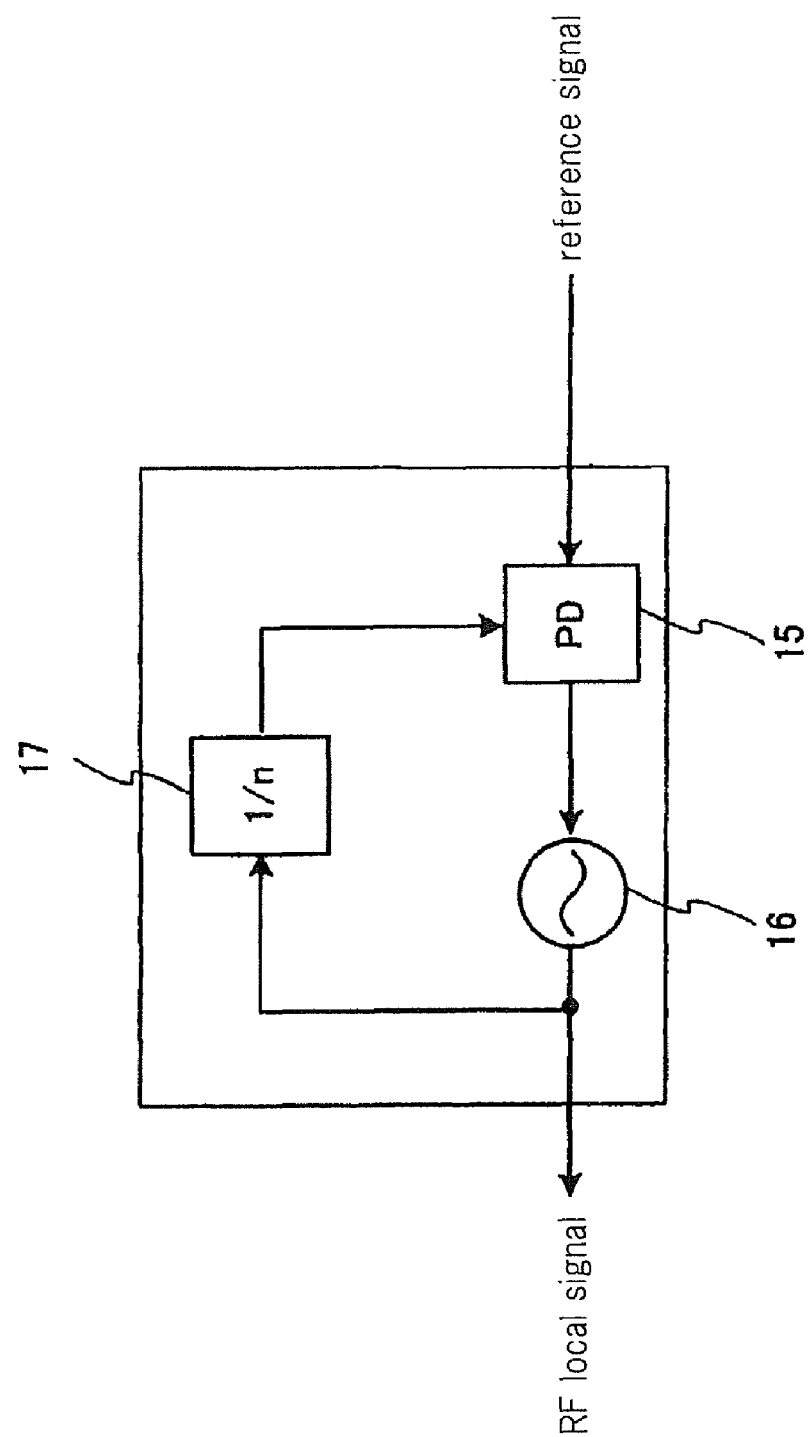
FIG. 5 is a diagram showing a configurational example of a local oscillator used in a reference synchronization scheme.
Figure 6:
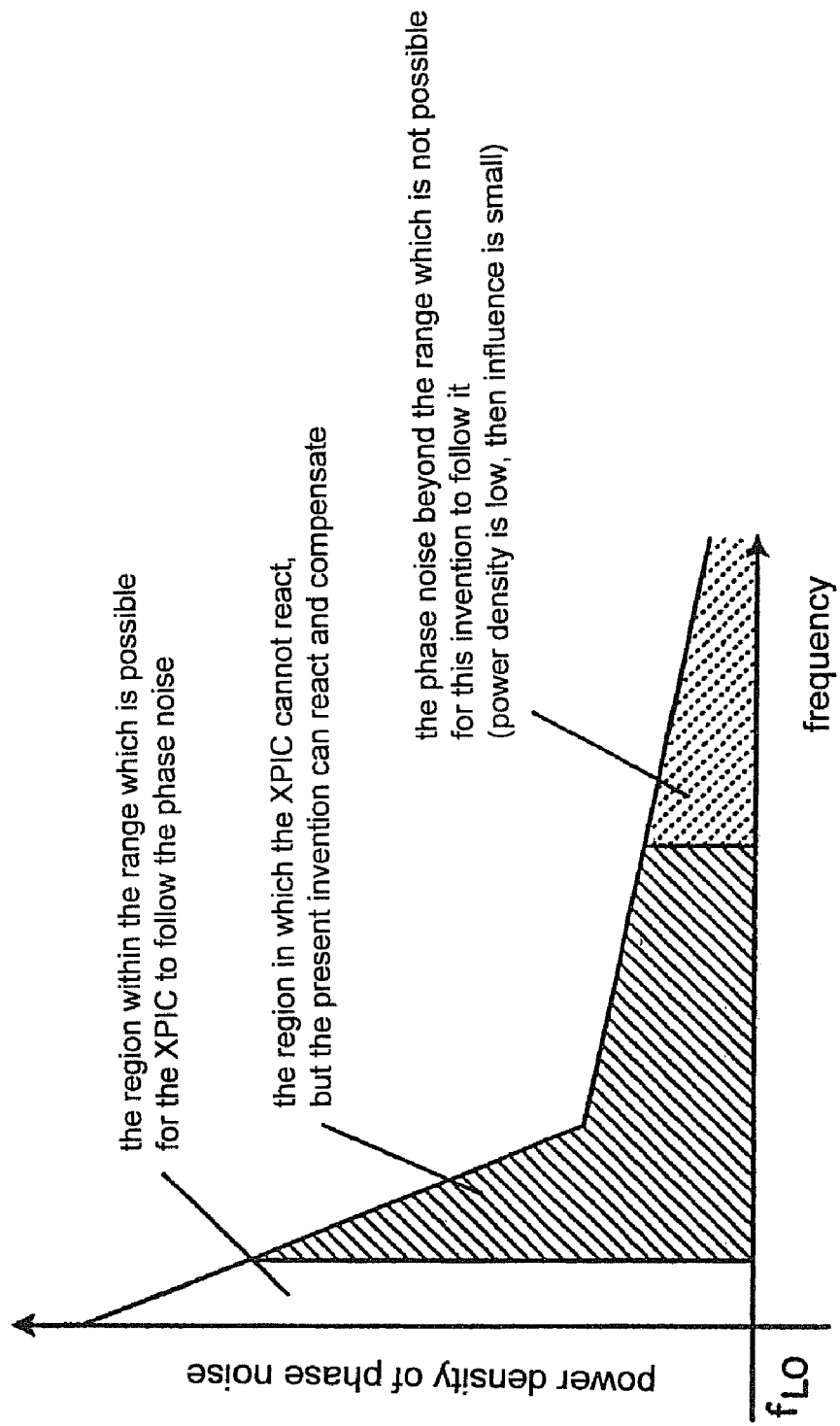
FIG. 6 is a chart showing the behavior of phase noise in a RF local signal.
Figure 7:
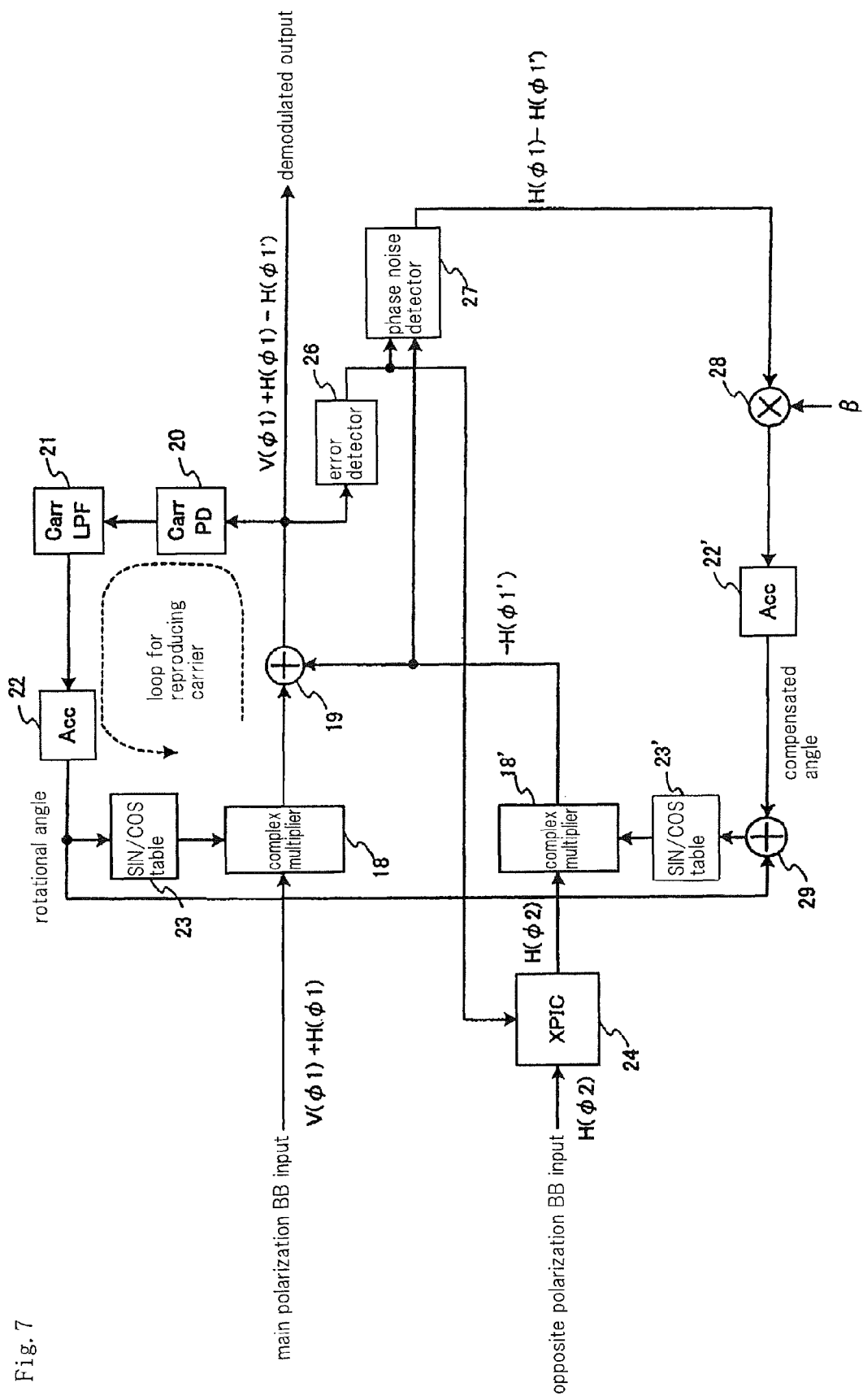
FIG. 7 is a block diagram showing the first exemplary embodiment of the present invention.

A cross polarization interference canceling apparatus of the first exemplary embodiment of the present invention will be described. FIG. 7 is a block diagram showing an essential part of a cross polarization interference canceling apparatus of the first exemplary embodiment, in which the portion downstream of the outputs from orthogonal demodulators 8 and 11 shown in FIG. 4 is shown. The configuration upstream of orthogonal demodulators 8 and 11 is that shown in FIG. 4. The blocks allotted with the same reference numerals as in the conventional example shown in FIG. 3 have the same functions except that input control signals are partly different.

First, connection for signal transmission between the components shown in FIG. 7 will be described.

As shown in FIG. 7, the output side of complex multiplier 18 is connected to adder 19. Connected to the output side of adder 19 is a signal line for transmitting demodulated signals. Carrier phase detector (Carr PD) 20 and error detector 26 are connected to this signal line.

The output side of carrier phase detector 20 is connected to accumulator 22 via loop filter (Carr LPF) 21. The output signal line from accumulator 22 is branched into two, one signal line of the two being connected to complex multiplier 18 via SIN/COS table 23.

Input to XPIC 24 is an opposite polarization signal. Complex multiplier 18' is connected to the output side of XPIC 24. The output signal line from complex multiplier 18' is branched into two, one signal line of the two being connected to adder 19.

The output signal line from error detector 26 is branched into two, one signal line of the two being connected to phase noise detector 27. The other signal line is connected XPIC 24. Of the two branched output signal lines in the above complex multiplier 18', the other signal line is connected to phase noise detector 27. The output side of phase noise detector 27 is connected to adder 29 by way of multiplier 28 and accumulator 22'.

The other signal line among the two branched output signal line in the aforementioned accumulator 22 is connected to adder 29. The output side of adder 29 is connected to complex multiplier 18' via SIN/COS table 23'.

Next, individual components will be described.

Complex multiplier 18 corrects the carrier phase of the input main polarization signal and outputs the signal with its carrier phase synchronized. Carrier phase detector 20 detects the phase error of the input demodulated signal. Loop filter 21 removes high-frequency components from the signal received from carrier phase detector 29 and outputs the result to accumulator 22. Accumulator 22 generates and outputs a saw-toothed wave having a frequency corresponding to the magnitude of the signal received from loop filter 21. SIN/COS table 23 selects a SIN/COS signal that indicates a phase rotational angle of the saw-toothed wave output from accumulator 22 and outputs it to complex multiplier 18.

XPIC 24 includes a typical adaptively controlled FIR, and when an opposite polarization signal is input, it generates a signal that cancels the opposite polarization signal that was mixed into the main polarization by referring to the signal received from error detector 26. Registered beforehand in error detector 26 is information that indicates ideal phase rotational angles for the main polarization signal in complex multiplier 18. This information is represented, for example by the position of a lattice point on the coordinates that show phase rotational angles. Error detector 26 determines the difference between the phase of the received demodulated signal and the registered ideal phase and outputs the error signal that indicates the phase difference.

Phase noise detector 27 determines a phase noise difference to indicate the phase direction of the phase noise component, based on the output from complex multiplier 18' and the error determined in error detector 26.

Multiplier 28 weights the phase noise difference included as a piece of information in the signal received from phase noise detector 27 in a predetermined manner, to thereby adjust the control quantity of the phase noise difference to achieve optimal control of compensation. The signal including the information on the weighted phase noise difference is output to accumulator 22'.

Accumulator 22' reads out the information on the phase noise difference from the signal received from multiplier 28 and integrates the phase noise difference and determines a phase compensating angle that indicates the phase angle to be corrected from the integrated phase noise difference and sends it out to adder 29. It is noted that multiplier 28 and accumulator 22' constitute a control signal generator. The signal output from the control signal generator corresponds to the control signal of the present invention.

When the information on the sum of the phase rotational angle and the phase compensating angle is input, SIN/COS table 23' selects a SIN/COS signal that indicates the phase angle corresponding to the information from the table and sends it out to complex multiplier 18'.

Complex multiplier 18' corrects the phase angle of the signal in accordance with the SIN/COS signal received from SIN/COS table 23'. It is noted that complex multiplier 18' corresponds to the phase rotator of the present invention.

Next, signal flow in the cross polarization interference canceling apparatus of the present exemplary embodiment will be briefly described.

The carrier phase of the main polarization input signal is corrected by complex multiplier 18 so that it is output with its carrier synchronized. The demodulated signal output from adder 19 is input to carrier phase detector 20, and the phase error is detected by carrier phase detector 20. High frequency components are removed from the detected phase error signal by loop filter 21 and the resultant signal is input to accumulator 22.

Output from accumulator 22 is a saw-toothed wave having a frequency corresponding to the magnitude of the input signal. This saw-toothed wave represents the phase rotational angle of the main polarization signal in complex multiplier 18. Accordingly, a SIN/COS signal that indicates the phase rotational angle output from accumulator 22 is selected from the table at SIN/COS table 23, and the SIN/COS signal is input to complex multiplier 18. Here, accumulator 22 and SIN/COS table 23 constitute a numeric controlled oscillator (NCO; Numeric Controlled Oscillator). The circuitry from phase detector 20 to SIN/COS table 23 constitutes a PLL (Phase Locked Loop) for performing carrier reproduction.

On the other hand, when an opposite polarization signal is input into XPIC 24, a signal that cancels the cross-polarized interference wave that has been mixed into the main polarization is generated in XPIC 24. As the output from XPIC 24 is input to complex multiplier 18', the signal undergoes phase correction and is output from complex multiplier 18'. The signal that was phase corrected at complex multiplier 18' is branched into two, one of which is added to the main signal at adder 19, the other being input to phase noise detector 27.

Error detector 26 determines the error from the lattice point that indicates the phase of the ideal received signal with regard to the demodulated signal output from adder 19, and outputs an error signal indicating that error. Phase noise detector 27 determines a phase noise difference that indicates the phase direction of the phase noise component, based on the output from complex multiplier 18' and the error signal determined at error detector 26. A specific example of determining the phase noise difference will be described in detail later. Describing the method briefly, when the output from complex multiplier 18' is expressed as vector a' and the error signal output of error detector 26 is expressed as vector e on the phase rotational angle coordinates, phase noise difference θ from the position (−a) at which vector a'should be originally located can be determined by $\theta = \pi - 2 \times (\angle a'oe)$.

The phase difference signal containing the information on the determined phase noise difference is input to multiplier 28. Multiplier 28 weights the phase noise difference to be the phase difference of the determined phase noise with coefficient b, so as to adjust the control quantity to achieve optimal control of compensation. The correction control signal that indicates the adjusted control quantity is integrated at accumulator 22', and the resultant signal is output as a phase compensating angle that indicates the phase angle to be corrected.

When the corrected angle signal containing the information on the phase compensating angle output from accumulator 22' is input to adder 29, the phase compensating angle is added to the phase rotational angle on the main signal side at adder 29, and the resultant signal is input to SIN/COS table 23'. Then, when the SIN/COS signal obtained from SIN/COS table 23' is input to complex multiplier 18', the signal input from XPIC 24 is phase corrected at complex multiplier 18'.

Next, the operation of the cross polarization interference canceling apparatus of the present exemplary embodiment will be described. FIGS. 8 and 9 are diagrams for illustrating the principle of canceling phase noise in the present exemplary embodiment.

The loop formed by carrier phase detector 20, loop filter 21, accumulator 22, SIN/COS table 23 and complex multiplier 18 is a carrier reproduction PLL. Carrier phase detector 20 outputs the error of the current carrier phase from an ideal phase. As the output signal is applied to loop filter 21, loop filter 21 removes high-frequency components from the signal and coverts it into a frequency signal. When this frequency signal is determined to be ahead of a phase of the output signal in phase by carrier phase detector 20, complex multiplier 18 adjusts the phase rotational speed in such a direction as to delay the carrier phase (delay frequency). In this way, carrier synchronization is established.

XPIC 24, by calculating the correlation between the error signal from the signal point, detected from the signal that was demodulated from the main polarization signal by error detector 26 and the opposite polarization signal input to XPIC 24, detects the opposite polarization signal that had been mixed in the main signal to thereby generate a signal that compensates it. The detail of the operation of XPIC 24 is disclosed in patent document 1, for example, so that a detailed description is omitted herein.

Error detector 26 detects an error vector to be the vector that indicates the difference between the actual position of the received signal and the position (lattice point) at which the main polarization signal is supposed to be. Phase noise detector 27 determines the phase difference between the error vector calculated by error detector 26 and the cross polarization interference signal input from complex multiplier 18' and outputs an error signal. This error signal is reflective of the phase noise difference between the main polarization and the opposite polarization.

Figure 9A:
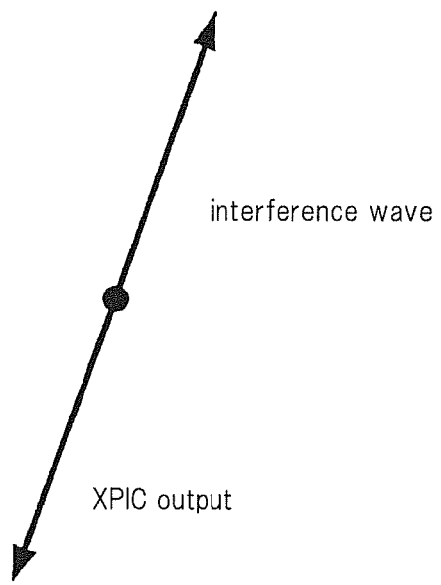
FIG. 9A is a diagram for illustrating the principle of compensating phase noise in the first exemplary embodiment.
Figure 9B:
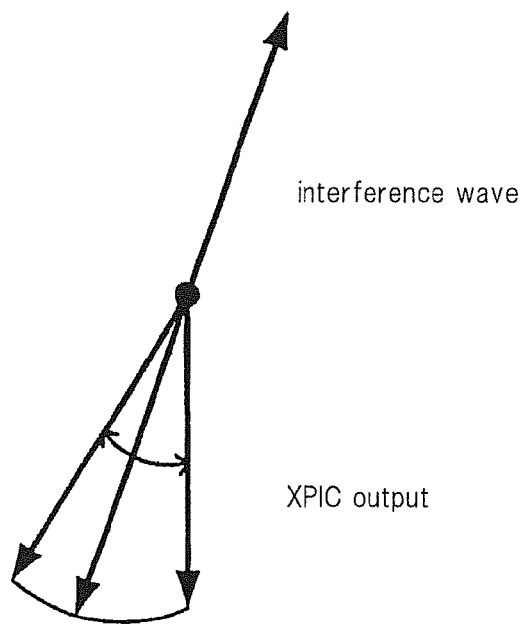
FIG. 9B is a diagram for illustrating the principle of compensating phase noise in the first exemplary embodiment.

As shown in FIG. 9A, XPIC 24 adjusts the amplitude and phase of the opposite polarization signal that has interfered with the main signal and outputs the resultant signal. On the other hand, when there is a cause to generate phase noise, as in the reference synchronization scheme shown in FIG. 9B, the opposite polarization component mixed in the main signal and the signal input to the XPIC from the opposite polarization input temporally change in phase. In this case, XPIC 24 is supposed to correct the phase change of the phase noise at any time, but the time constant of XPIC is generally low compared to the frequency characteristics of the phase noise, so that the portion in which the phase change of the phase noise cannot be followed appears as characteristics deterioration.

As shown in FIG. 8A (shown with an example of QPSK in FIG. 8A), XPIC 24 compensates the interference influence by subtracting the interference compensating signal generated from the opposite polarization signal, from the received signal that has undergone cross polarization interference. In FIG. 8A, for original signal (which indicates an ideal signal) D, interference component a is mixed forming the received signal that deviated from the original shape (four points QPSK). XPIC 24 generates canceling component a'(=−a) to cancel out this interference component a. Adding the XPIC output to the received signal that has undergone interference makes it possible to produce the received signal from which cross polarization interference has been removed.

When there is influence of phase noise, the directions of interference component a and canceling component a' continuously vary from one moment to another though they are, on average, opposite to each other. When change in direction is slow, signals that present interference component a and canceling component a' directed opposite to each other are generated by the compensating function of XPIC 24, as shown in FIG. 8B. However, when it exceeds the processing speed of XPIC 24, interference component a and canceling component a' will not be oriented in exactly the opposite directions, as shown in FIG. 8C. As a result, error e that cannot be compensated arises, which finally shifts the received signal point, degrading the characteristics of the receiver.

As shown in FIG. 8C, among interference wave a corresponding to the interference component and compensating signal a' corresponding to the canceling component and compensation error e, those which can be really detected or observed are compensation error e that is the output from error detector 26 for detecting the error vector between the position (lattice point) at which the received signal point is supposed to be and the demodulation output and compensating signal a' which is the direct output from complex multiplier 18'. As shown in FIG. 8C, from the relationship between correction error e and compensation signal a', it is possible to acquire the knowledge of phase noise difference q between a' and −a.

That is, when the vector of the cross polarization interference compensating signal is expressed as a', the vector of the error signal is expressed as e, and o denotes the reference point of these vectors, phase noise difference q can be extracted by $\theta = \pi - 2 \times (\angle a'oe)$. Here, $\angle a'oe$ is the angle formed between vector a' and vector e when vector e is viewed from vector a' in the counterclockwise direction, as shown in FIG. 8C. If this phase difference is used to control complex multiplier 18' disposed at the XPIC 24 output so as to perform phase adjustment in a direction that makes the phase difference between the phase of the carrier component of the main polarization and the phase of the carrier component of the cross polarization interference compensating signal, it is possible to compensate the influence of the phase noise.

The correction quantity of the signal output from phase noise detector 27 is adjusted at multiplier 28 and the signal is converted into a phase correcting angle at accumulator 22'. Then, the phase correcting angle from accumulator 22' is added to the phase correcting angle from accumulator 22 and the resultant signal is output to SIN/COS table 23'. The output from XPIC 24 is phase-rotated by SIN/COS table 23' and complex multiplier 18', so as to achieve control in a direction that reduces the phase difference between the main polarization signal and the phase noise involved in the carrier component of the cross polarization interference compensating signal.

Since the phase noise has no change in amplitude direction (has a change in phase only) basically, it is considered that the output signal from complex multiplier 18' changes in phase only but not in amplitude while cross polarization interference in a stable fixed amount is entering. Accordingly, the tap coefficients in XPIC 24 do not need to follow the phase noise by performing phase compensation of the phase noise with complex multiplier 18' located at the XPIC 24 output, hence it is possible to prevent the lowering of the capability of cross polarization interference cancellation based on the phase noise.

Further, since the phase rotation achieved by complex multiplier 18' involves a lower number of parameters to be changed compared to phase rotation by changing tap coefficients in XPIC 24, it is possible to reduce the time constant for control. Accordingly, the time constant of XPIC 24 is large correspondingly, hence it is possible to suppress noise arising from the XPIC itself when the time constant is set low.

Figure 10:
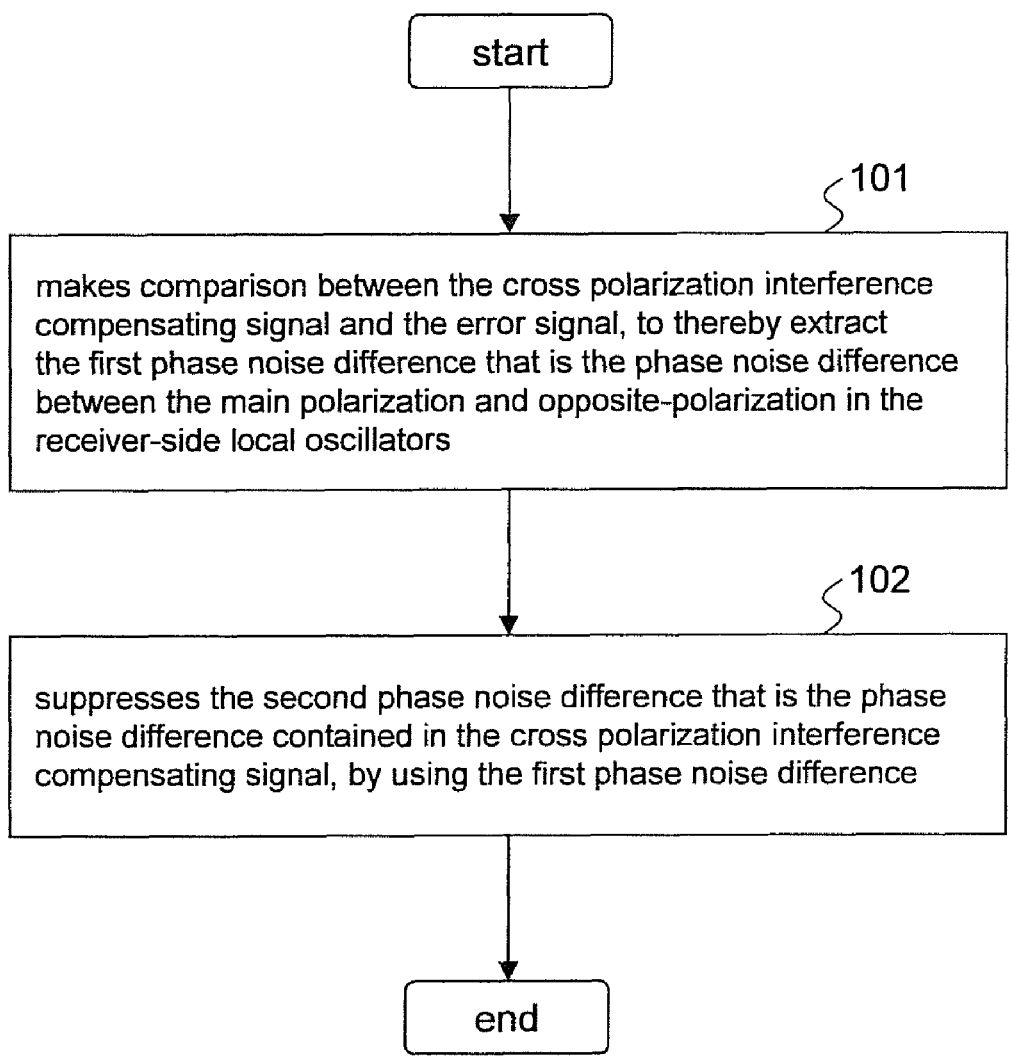
FIG. 10 is a flow chart for summarizing a cross polarization interference canceling method in the first exemplary embodiment.

FIG. 10 is a flow chart for summarizing the operational sequence of the cross polarization interference canceling method in the present exemplary embodiment. As shown in FIG. 10, error detector 26 determines the error signal that indicates the difference between the demodulated signal and the ideal received signal of the main polarization, and phase noise detector 27 makes comparison between the cross polarization interference compensating signal and the error signal, to thereby extract the first phase noise difference that is the phase noise difference between the main polarization and opposite polarization in the receiver-side local oscillators (Step 101). Then complex multiplier 18' suppresses the second phase noise difference that is the phase noise difference contained in the cross polarization interference compensating signal, by using the first phase noise difference (Step 102).

The Second Exemplary Embodiment

Figure 11:
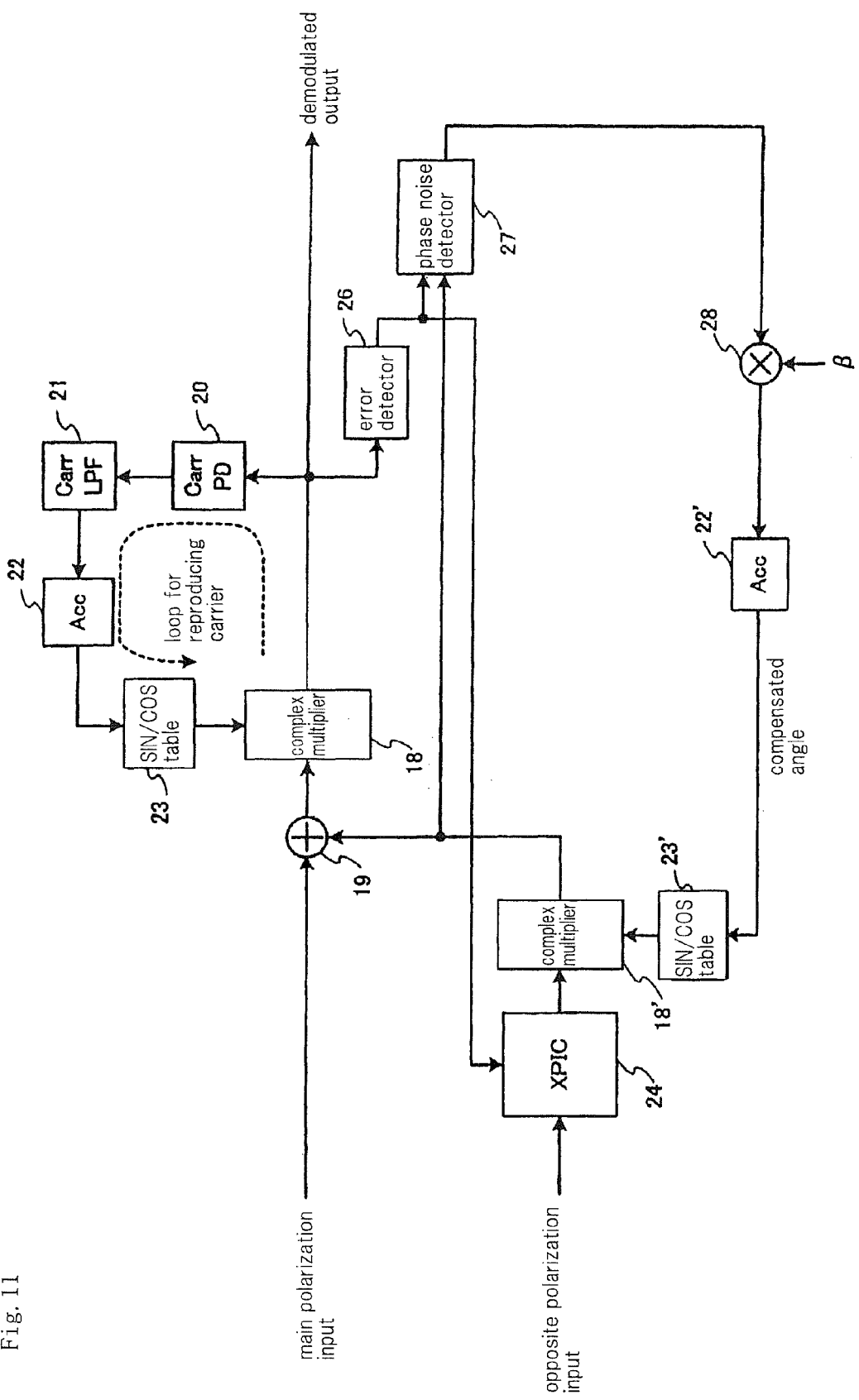
FIG. 11 is a block diagram showing the second exemplary embodiment of the present invention.

A cross polarization interference canceling apparatus of the second exemplary embodiment of the present invention will be described. FIG. 11 is a block diagram showing a cross polarization interference canceling apparatus of the second exemplary embodiment of the present invention. The above first exemplary embodiment uses a method of adding the XPIC signal after establishment of carrier synchronization. The second exemplary embodiment, however, uses a method of adding the XPIC signal before establishing carrier synchronization.

In the present exemplary embodiment, since complex multiplier 18' at the XPIC 24 output needs to simply correct only the phase difference caused by the influence of the phase noise, the configuration can be correspondingly simplified. Compared to the first exemplary embodiment, the configuration for adding the output from accumulator 22 and the output from accumulator 22' is omitted as shown in FIG. 11.

Here, the present exemplary embodiment and the first exemplary embodiment only differ on whether the XPIC signal is added after establishing carrier synchronization or whether the XPIC signal is added before establishing carrier synchronization, its basic operation being the same as that of the first exemplary embodiment so that description of the operation is omitted.

The Third Exemplary Embodiment

Figure 12:
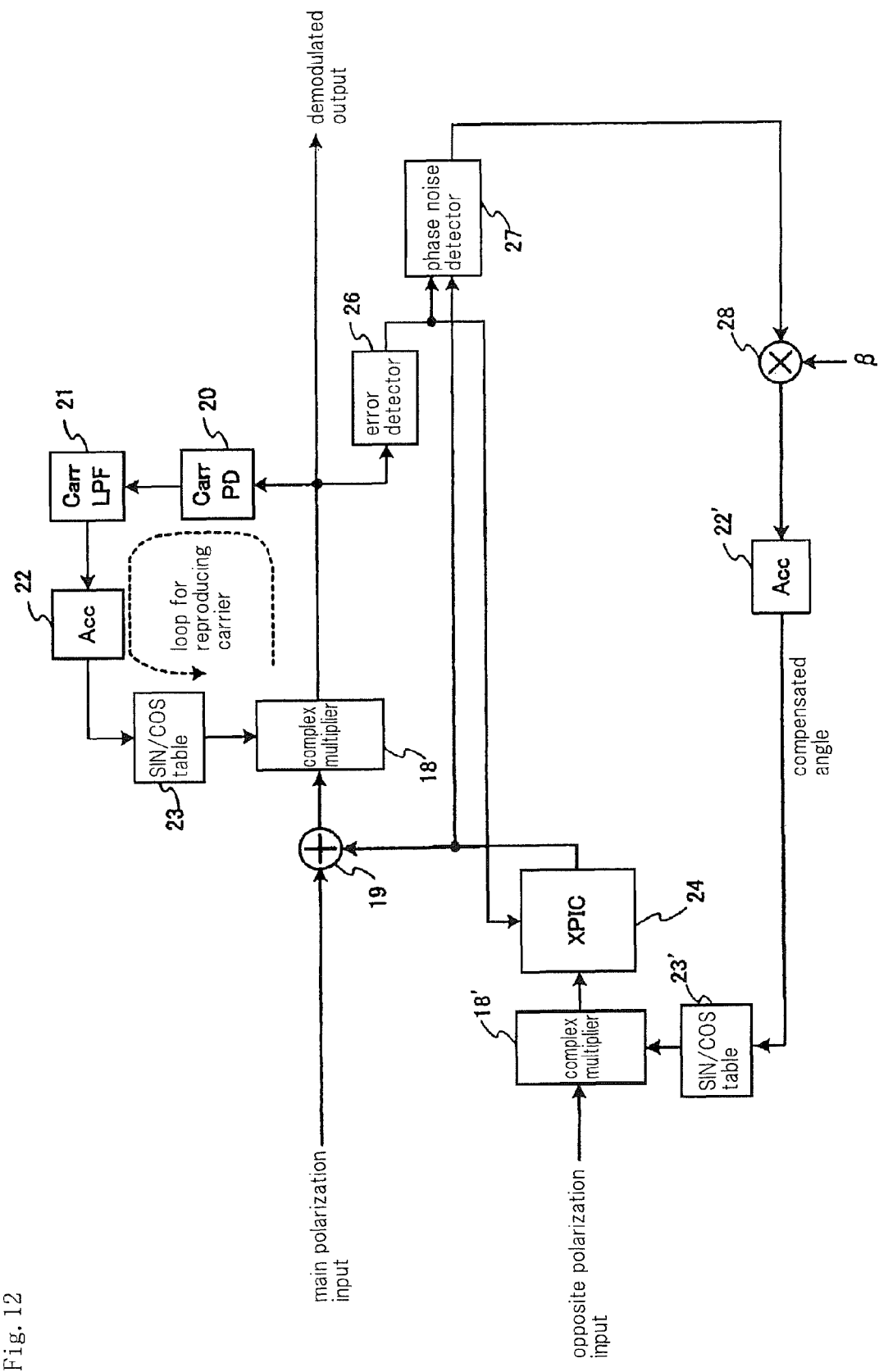
FIG. 12 is a block diagram showing the third exemplary embodiment of the present invention.

A cross polarization interference canceling apparatus of the third exemplary embodiment of the present invention will be described. FIG. 12 is a block diagram showing a cross polarization interference canceling apparatus of the third exemplary embodiment of the present invention. The present exemplary embodiment has a configuration in which the complex multiplier 18' in the second exemplary embodiment is disposed on the input side of XPIC 24. That is, phase compensation can also be performed by changing the phase of the input signal to XPIC 24. In this case, complex multiplier 18' is arranged before XPIC 24 as shown in FIG. 12.

Figure 13:
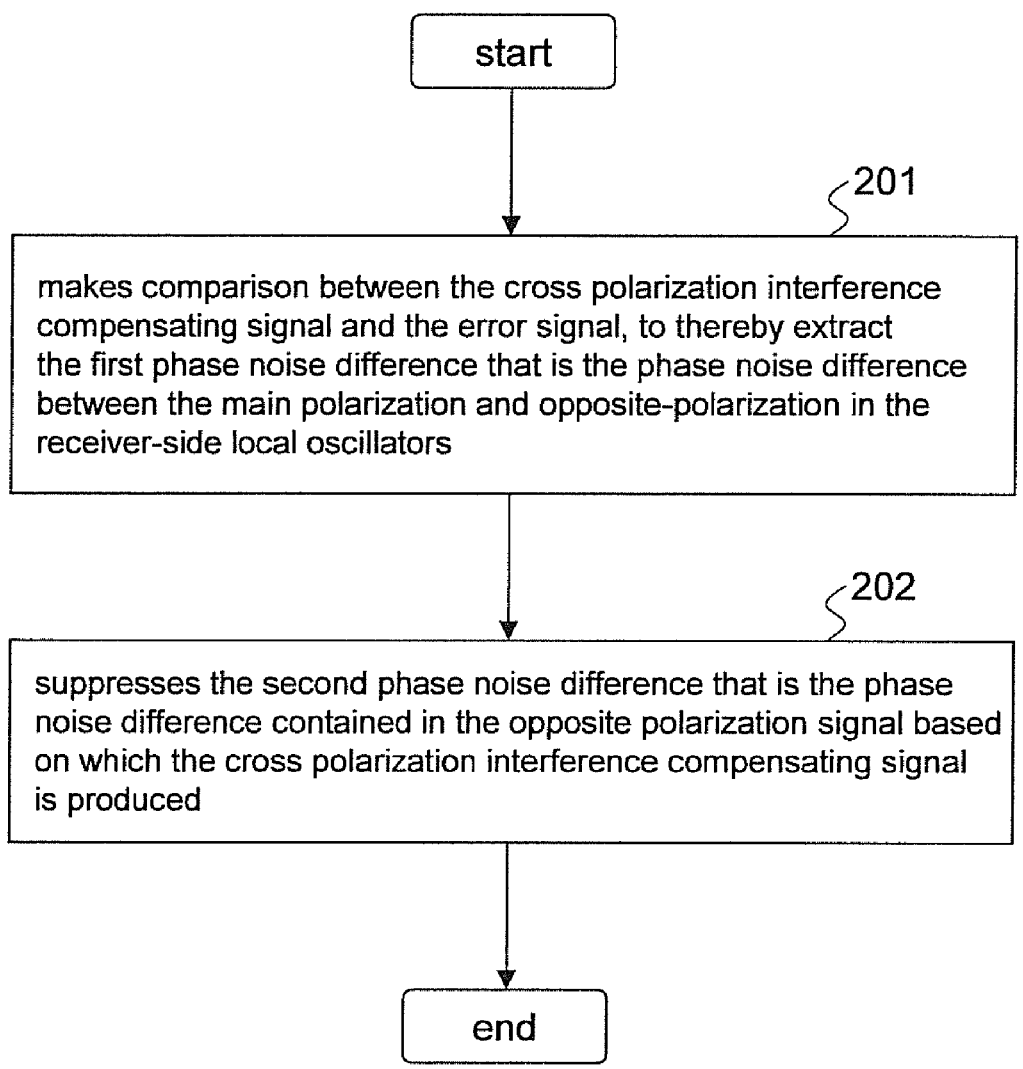
FIG. 13 is a flow chart for summarizing a cross polarization interference canceling method in the third exemplary embodiment.

FIG. 13 is a flow chart for summarizing the operational sequence of the cross polarization interference canceling method in the present exemplary embodiment. As shown in FIG. 13, error detector 26 determines the error signal that indicates the difference between the demodulated signal and the ideal received signal of the main polarization, and phase noise detector 27 makes comparison between the cross polarization interference compensating signal and the error signal, to thereby extract the first phase noise difference that is the phase noise difference between the main polarization and opposite polarization in the receiver-side local oscillators (Step 201). Then complex multiplier 18', using the first phase noise difference, suppresses the second phase noise difference that is the phase noise difference contained in the opposite polarization signal based on which the cross polarization interference compensating signal is produced (Step 202).

The Fourth Exemplary Embodiment

Figure 14:
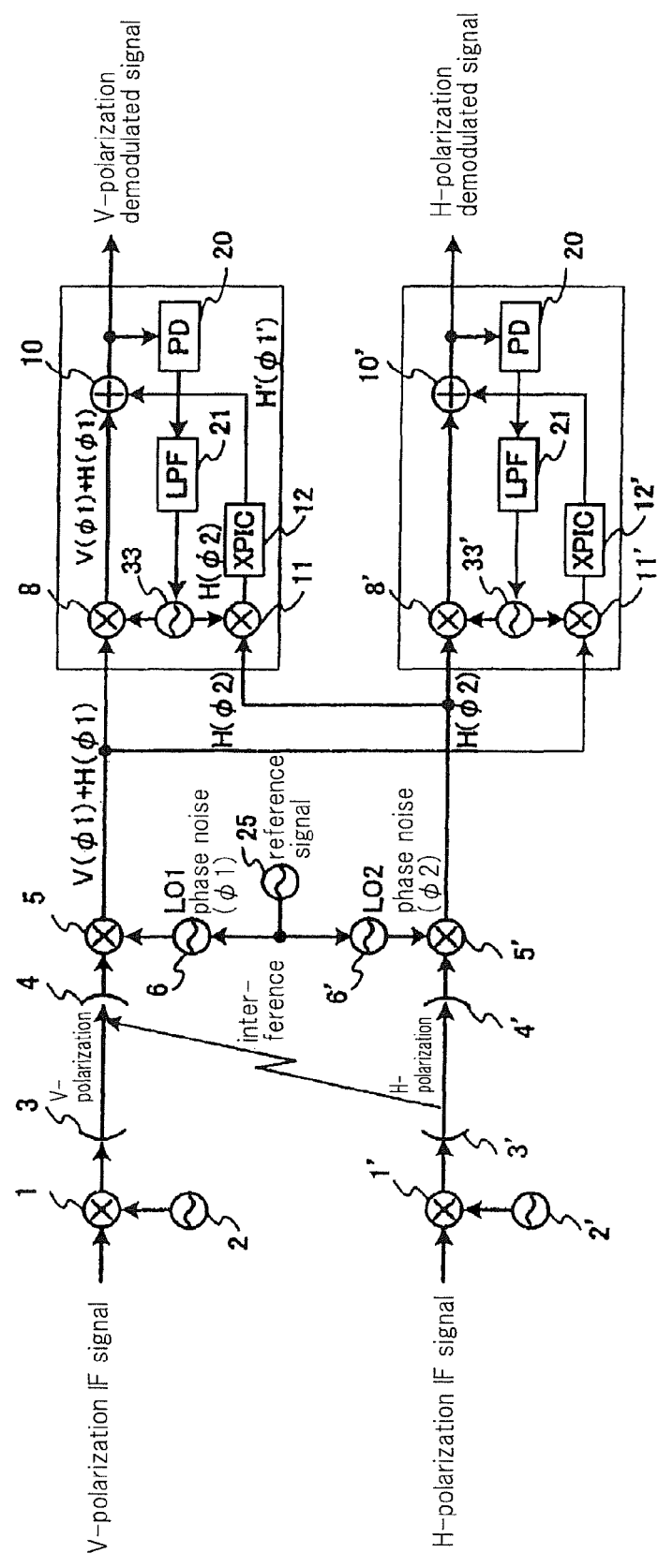
FIG. 14 is an entire block diagram showing the fourth exemplary embodiment of the present invention.
Figure 15:
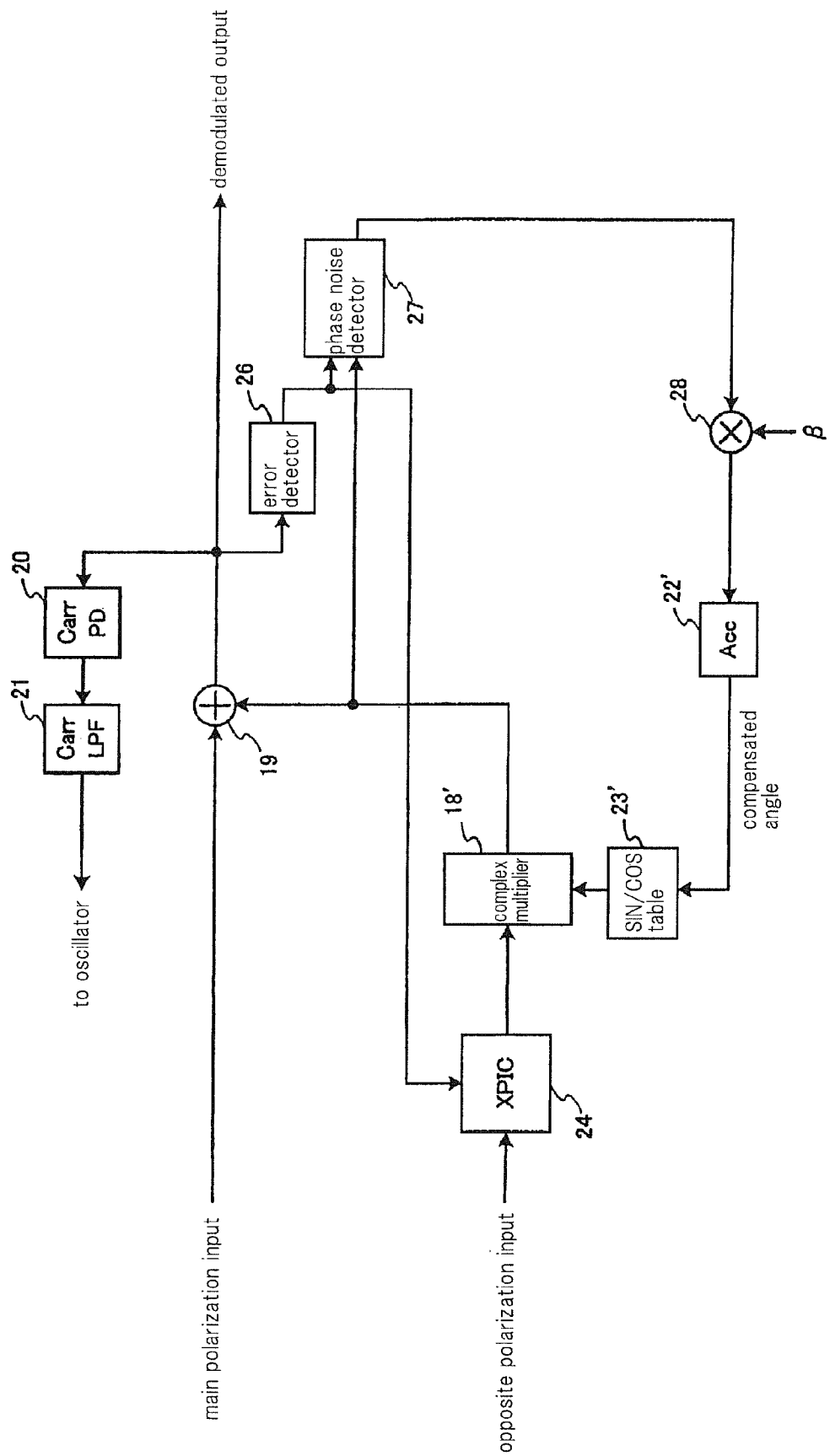
FIG. 15 is a block diagram showing the configuration downstream of the outputs from orthogonal demodulators in the fourth exemplary embodiment.

A cross polarization interference canceling apparatus of the fourth exemplary embodiment of the present invention will be described. FIG. 14 is an entire block diagram showing a cross polarization interference canceling apparatus of the fourth exemplary embodiment of the present invention. FIG. 15 is a block diagram showing the configuration downstream of the output from an orthogonal demodulator. FIGS. 14 and 15 show, respectively, the whole diagram and the configuration downstream of the outputs from orthogonal demodulators when the present invention is applied to a cross polarization interference canceling apparatus adopting a coherent detection scheme.

In the case of a coherence detection scheme, since carrier synchronization is established at orthogonal detectors 8 and 8', orthogonal detector 8,8', carrier phase detector 20, loop filter 21 and voltage controlled oscillator 33 constitute a PLL as shown in FIG. 14. In the case of the present exemplary embodiment, since carrier synchronization of the input signals is established, the complex multiplier on the main signal side shown in FIG. 11 is unnecessary as shown in FIG. 15.

Also in the present exemplary embodiment, the influence of the phase noise is removed by complex multiplier 18' arranged at the output of XPIC 24, in the same manner as in the second exemplary embodiment. Further, it is also possible to arrange complex multiplier 18' before XPIC 24 as in the third exemplary embodiment described with FIG. 12 though an example in which complex multiplier 18' is arranged after the output of XPIC 24 in FIG. 15 is explained.

As described in the first to fourth exemplary embodiments, since the present invention includes a means of detecting the difference between the phase noises in the receiver-side local oscillators for the main polarization and the opposite polarization from the received signal and suppressing the phase noise difference contained in the cross polarization interference compensating signal based on the result, it is not necessary for the XPIC to follow the phase noise difference.

Further, since the phase rotator for suppressing phase noise difference uses a lower number of parameters to be varied compared to the phase rotation based on a change of the tap coefficients inside XPIC, the time constant for control can be made small. Accordingly, it is possible to make the time constant of the XPIC correspondingly greater, hence it is possible to suppress the noise arising from the XPIC itself when the time constant of the XPIC is set smaller.

Also, in the XPIC of a reference synchronization scheme in which phase noise is problematic, in the present invention, the phase of the interference component mixed in the main polarization side is adjusted to phase by detecting the phase noise difference between the local signals by means of a phase noise detector and giving a phase rotation that will cancel the phase noise by means of a phase rotator provided at the XPIC output. Accordingly, even in the reference synchronization scheme, it is possible to create a condition under which the phase relationship between the carrier component of the interference wave and the carrier component of the compensating signal is stable, so that it is possible to prevent degradation of the cross polarization interference cancellation characteristics based on phase noise by following the phase noise of higher frequency components.

Also, when inexpensive RF local oscillators that present relatively large phase noise are used to construct an XPIC of reference synchronization scheme, it is possible to prevent the lowering of the cross polarization interference canceling capability based on phase noise.

The present invention should not be limited to the above exemplary embodiments, but various modifications can be made within the scope of the present invention and those of course should be included in the scope of the invention.

The invention claimed is:

1. A cross polarization interference canceling method based on a reception local synchronization scheme for canceling interference between main polarization and opposite polarization, comprising the steps of:
    extracting a first phase noise difference that is phase noise difference between said main polarization and said opposite polarization in a receiver-side local oscillator, by comparing an error signal that indicates a difference between a demodulated signal that is said main polarization signal in which compensation for cross polarization interference has been made and a received signal which indicates an ideal state of said main polarization with a cross polarization interference compensating signal that is said opposite polarization signal in which compensation for cross polarization interference; and
    suppressing a second phase noise difference that is phase noise difference contained in said cross polarization interference compensating signal, by using said first phase noise difference.

2. The cross polarization interference canceling method according to claim 1, wherein when a vector of said cross polarization interference compensating signal is a' and a vector of said error signal is e on phase rotational angle coordinates, said first phase noise difference θ is extracted by $$\theta=\pi-2\times(\angle a'oe)$$

($\angle a'oe$ is an angle between vector a' and vector e, inclusive of a rotational direction).

3. The cross polarization interference canceling method according to claim 1, wherein as said reception local synchronization scheme, a reception local synchronization scheme based on reference synchronization is used.

4. The cross polarization interference canceling method according to claim 2, wherein as said reception local synchronization scheme, a reception local synchronization scheme based on reference synchronization is used.

5. A cross polarization interference canceling method based on a reception local synchronization scheme for canceling interference between main polarization and opposite polarization, comprising the steps of:
    extracting a first phase noise difference that is phase noise difference between said main polarization and said opposite polarization in a receiver-side local oscillator, by comparing an error signal that indicates a difference between a demodulated signal that is said main polarization signal in which compensation for cross polarization interference has been made and a received signal that indicates an ideal state of said main polarization with a cross polarization interference compensating signal that is said opposite polarization signal in which compensation for cross polarization interference has been made; and
    suppressing a second phase noise difference that is phase noise difference contained in said opposite polarization signal based on which said cross polarization interference compensating signal is generated, by using said first phase noise difference.

6. The cross polarization interference canceling method according to claim 5, wherein when a vector of said cross polarization interference compensating signal is a' and a vector of said error signal is e on phase rotational angle coordinates, said first phase noise difference θ is extracted by $$\theta=\pi-2\times(\angle a'oe)$$

($\angle a'oe$ is an angle between vector a' and vector e, inclusive of a rotational direction).

7. The cross polarization interference canceling method according to claim 5, wherein as said reception local synchronization scheme, a reception local synchronization scheme based on reference synchronization is used.

8. The cross polarization interference canceling method according to claims 6, wherein as said reception local synchronization scheme, a reception local synchronization scheme based on reference synchronization is used.

9. A cross polarization interference canceling apparatus based on a reception local synchronization scheme for canceling interference between main polarization and opposite polarization, comprising:
    an error detector for extracting a difference between a demodulated signal that is said main polarization signal in which compensation for cross polarization interference has been made and a received signal which indicates an ideal state of said main polarization, and outputting an error signal that indicates extracted difference;
    a phase noise detector for outputting a phase noise difference by comparing a cross polarization interference compensating signal that is said opposite polarization signal in which compensation for cross polarization interference has been made with said error signal;
    a control signal generator for generating a control signal corresponding to said phase noise difference; and
    a phase rotator disposed prior to, or posterior to, a cross polarization interference canceller for generating said cross polarization interference compensating signal, for controlling a phase of said cross polarization interference compensating signal in such a direction as to suppress said phase noise difference, in response to an input of said control signal.

10. The cross polarization interference canceling apparatus according to claim 9, wherein said control signal generator integrates phase noise difference detected by said phase noise detector and determines a phase compensating angle that indicates a phase angle to be corrected based on an integrated phase noise difference to supply a phase compensating angle to said phase rotator.

11. The cross polarization interference canceling apparatus according to claim 10, wherein said control signal generator weights said phase noise difference detected by said phase noise detector to adjust control quantity for phase noise difference.

12. The cross polarization interference canceling apparatus according to claim 10, wherein when a vector of said cross polarization interference compensating signal is a', a vector of said error signal is e, said phase noise difference θ is extracted by $$\theta=\pi-2\times(\angle a'oe)$$

($\angle a'oe$ is an angle between vector a' and vector e, inclusive of a rotational direction).

13. The cross polarization interference canceling apparatus according to claim 9, wherein said control signal generator weights said phase noise difference detected by said phase noise detector to adjust control quantity for phase noise difference.

14. The cross polarization interference canceling apparatus according to claim 13, wherein when a vector of said cross polarization interference compensating signal is a', a vector of said error signal is e, said phase noise difference θ is extracted by $$\theta = \pi - 2 \times (\angle a'oe)$$

(∠a'oe is an angle between vector a' and vector e, inclusive of a rotational direction).

15. The cross polarization interference canceling apparatus according to any one of claim 9, wherein when a vector of said cross polarization interference compensating signal is a', a vector of said error signal is e, said phase noise difference θ is extracted by $$\theta = \pi - 2 \times (\angle a'oe)$$

(∠a'oe is an angle between vector a' and vector e, inclusive of a rotational direction).

* * * * *